July 30, 1935. T. H. LAY 2,009,668
PLANT SUPPORT
Filed Nov. 25, 1933
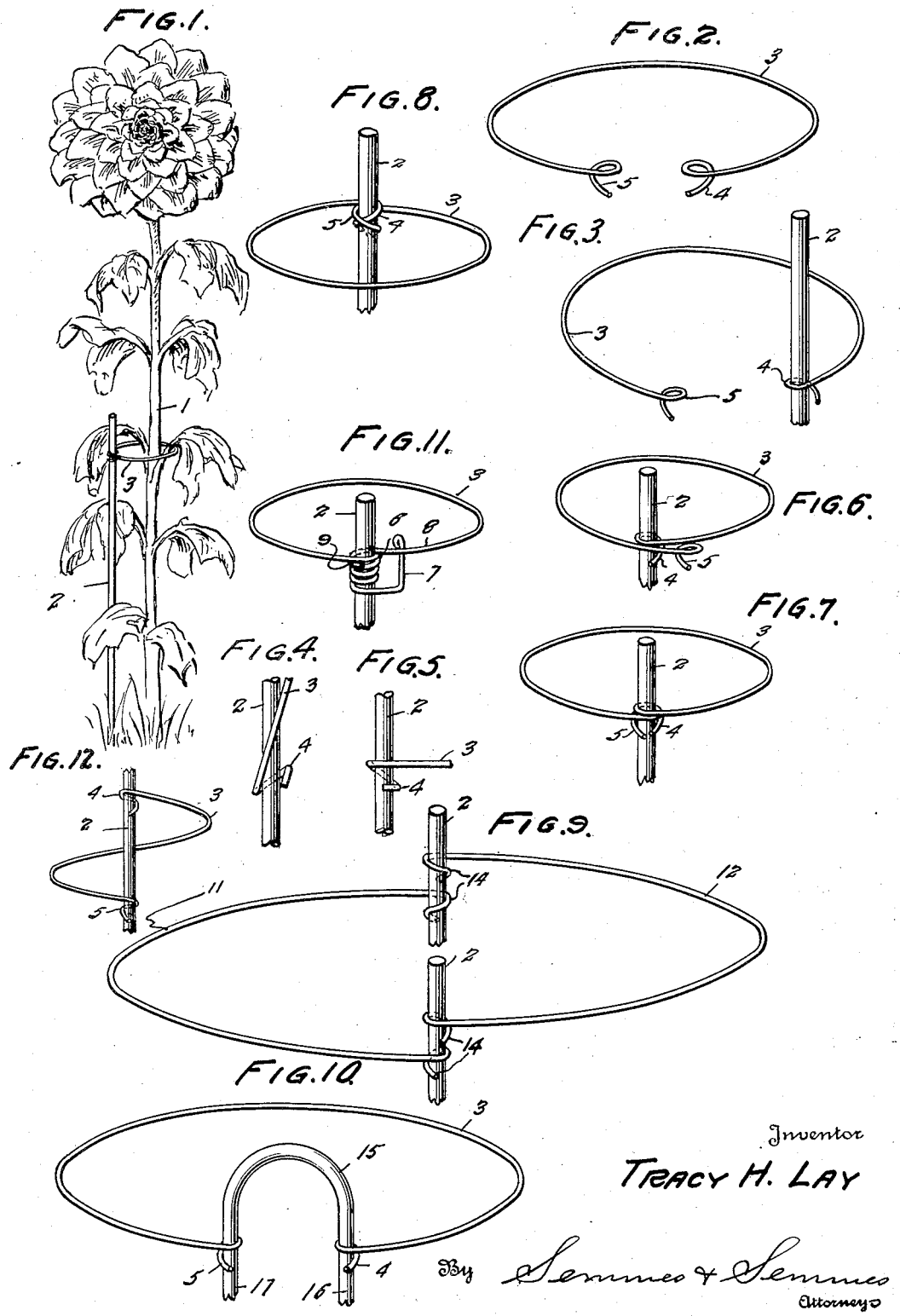
Inventor
TRACY H. LAY
By Semmes & Semmes
Attorneys Patented July 30, 1935

2,009,668

UNITED STATES PATENT OFFICE 2,009,668

PLANT SUPPORT

Tracy H. Lay, Washington, D. C.

Application November 25, 1933, Serial No. 699,774

10 Claims. (Cl. 47—47)

This invention relates to garden implements, and more particularly has reference to a support for plants.

While there have been numerous devices for affording the necessary support to certain types of plants that require it, such previous supports have been open to certain objections. Plant supports usually comprise an upright member which is driven in the ground adjacent the plant, and a plant-embracing element which extends from the upright member around the plant. It is often preferable that the plant-embracing element lie in a substantially horizontal plane, perpendicular to the upright member. To insure this, and for other reasons, the prior devices have been of a relatively complicated construction which, of course, not only adds to the cost of manufacture, but also renders more difficult their assembly or disassembly. Still another disadvantage resides in the fact that most of the prior devices are not susceptible of variation in order to accommodate plants of different sizes. The foregoing objections will be appreciated when it is remembered that numerous supports are required in even a relatively small garden, and that it is frequently necessary to adjust the support for different stages of growth of the plant.

One of the objects of my invention is to overcome the above difficulties.

Yet another object of my invention is to devise a plant support that is economical of manufacture, and yet of sufficient strength for the intended purposes.

Still another object of my invention is to provide a plant support that may be readily assembled and disassembled.

A still further object of my invention is to provide a plant support that may accommodate plants of different sizes.

To accomplish the above and other important objects as will more fully appear hereinafter, my invention in general includes means for surrounding and supporting a plant, or group of plants, and other means in association therewith for maintaining the plant embracing member at a predetermined and fixed position above the ground.

In order that my invention may be better comprehended, I have set forth in the accompanying drawing several embodiments of my inventive concept, with the understanding that such embodiments are exemplary merely, and that various modifications may be made therein without departing from the scope of my invention. In the drawing, in which similar numerals refer to the same parts Figure 1 is an elevational view of my invention, assembled and supporting a plant.

Fig. 2 is a perspective view of the plant embracing member in inoperative position.

Fig. 3 shows the first step in assembling the plant embracing member upon the upright member.

Fig. 4 is a detailed view of the first step.

Fig. 5 is a detailed view of what might be considered the second step.

Fig. 6 is a view of what might be considered the third step.

Fig. 7 is a view of one form of completed assembly.

Fig. 8 is a view of the assembled units, but looking in the opposite direction.

Fig. 9 shows my invention applied to a modified form of supporting means;

Fig. 10 is a view of a still further modified form of upright member which may be used in conjunction with the plant embracing member.

Fig. 11 shows a modified form of plant embracing member.

Figure 12 shows another method of assembling the device of Figures 1 to 7 inclusive.

My invention in general comprehends the use of a length of wire, preferably although not necessarily resilient. This wire surrounds the plant to be supported and is secured to an upright by virtue of certain helices at the end of the wire. Referring more particularly to the drawing, in Figure 1 there is disclosed a plant I which, in the present case, is a single stem plant. It will be appreciated, of course, that my invention is adapted for use in supporting a plurality of plants, or plants that grow in a clump-like formation, in which event the support may embrace the entire clump. This will be adverted to in somewhat greater detail hereinafter.

The numeral 2 designates an upright member which is adapted to have one of its ends inserted in the ground adjacent the plant to be supported. As shown in the drawing, the upright 2 may be cylindrical in cross section, and in actual practice a wooden, metallic or other type of rod may be employed. Although I prefer that the upright be cylindrical, it will be appreciated that a rod of a different shape, or material, may be employed. I may use an upright of square, triangular, or polygonal cross section, or of an irregular and non-uniform cross section.

A plant embracing means 3, which in this form is generally an elastic loop, is secured to the upright 2, and is maintained in a plane perpendicular to the upright by virtue of the clamping means which will be described. The member 3 is preferably made of resilient material, and may be formed from a length of brass wire. Under certain conditions, other materials may be employed for the member 3, such as spring steel, or other elastic material.

In the preferred embodiment of my invention, as disclosed in Figures 1 through 10, it will be seen that the wire 3 is bent to form substantially a circle, but that the circle is not completed and a space is left between the two ends, thus tensioning the helical ends away from each other. Each end of the wire is turned to form helices 4 and 5. These helices may be of large or small angle and may be greater in diameter than the upright 2. The tension of the wire 3 supports the device once the helices are in place surrounding the upright. It is to be noted the helices extend downward from the wire loop 3 and give a sturdy support to loads imposed on the structure.

As will also be apparent from the drawing, the helices 4 and 5 are of only a single convolution. The provision of a single convolution enables the wire to be assembled upon the support very readily and without the necessity of slipping either one or both of the helices over the top of the support and then letting it slide down to the desired position above the ground. This will be apparent from the following. The spring in the loop binds the device in place, which spring is an additional binding factor to that of the force of gravity. In light weight wire the force of gravity is not of great moment in this resilient type of device; however, in the heavier devices of non-resilient material, which will be later described, the force of gravity acting through the weight of the loop to hold the grip of the helices on the support is of prime importance.

In order that the method of assembling the wire upon the sticks may be clearly understood, I shall recite the various individual steps. However, it will be appreciated that in actual operation, the assembly corresponds more closely to a single operation than to a series of steps. The ease and simplicity of assembling the entire support is one of the principal advantages of my invention, and I merely list the steps in order that there may be no misunderstanding about the preferred procedure.

Initially, either one of the two helices 4 or 5 is slipped over the support 2. In Figure 3 I have shown the first step in affixing the helix 4 to the upright. The opposite end of the wire may then be brought over so that the helix 5 overlaps helix 4, as shown in Figure 6. In this action the helix 5 may be affixed overlapping helix 4 initially, or it may be slipped over the upright 2 and slid up into the overlapping position. In the final assembly it of course makes no difference which helical end is on top of the other.

In Figure 12 is shown an assembly in which the helical ends do not overlap. Under certain conditions of operation this form of assembly gives good results. Since both helices point down, considerable load can be supported by the device even in this form of assembly.

The form of overlapping assembly shown in Figure 7 gives great strength.

As above stated, I find it preferable for the helix 5 to clasp the helix 4, as best shown in Figures 7 and 8, or vice versa. However, this is not essential, and a secure clamping may be effected when the two helices merely surround the upright and do not lie one over the other. This is readily apparent from an inspection of Figure 12.

While it is of course apparent that the wire 3 and the support 2 may be of any desired size in order to accommodate different types of plants, or different numbers of plants, I find that the structure disclosed in Figures 1 through 8 and in Figure 12 is particularly adapted for smaller plants. When a support for heavier plants, or shrubbery, is desired, I prefer to slightly modify the structure as shown in Figure 9. It is to be noted, however, that the support of Figure 9 employs the same basic principle, and differs from the other figures in merely matters of detail. In this figure I employ two uprights 2, preferably on opposite sides of the plant or plants. In lieu of a single wire 3 to completely surround the plant, I make use of two wires 11 and 12, each forming a separate loop, but neither a closed loop. As heretofore stated, the plant embracing element is not necessarily brass wire, or even resilient, and in the device shown in Figure 9 I usually employ mere heavy galvanized wire, which may be substantially non-resilient. The wires 11 and 12 are provided at their ends with helices 14, which may be similar to the helices 4 and 5; it being understood they may be much larger.

Reference has been made to the fact that the helices 4 and 5 need not necessarily overlap, and it will be noted in Figure 9 that the corresponding helices of the wires 11 and 12 are positioned at different heights on their uprights. It might be said that this is sometimes preferable, in view of the fact that the foliage on a plant is not necessarily distributed evenly, and it is frequently desirable to space the two wires in the device of Figure 9.

Figure 10 shows merely a modified form of upright and the same wire 3 may be employed. This upright, designated generally 15, is of yoke-like construction having two arms 16 and 17. One of the helices may be clasped to one of the arms, while the other helix is clasped to the other arm. This again illustrates the fact that the helices need not be overlapped. The wire in this form may be resilient or non-resilient. If non-resilient, the force of gravity binds the helices to the uprights.

I have shown in Figure 11 a modified form of plant embracing element. In this figure the wire 3 is provided with a helix 6 having several convolutions. It will be noted that the helix 6 is not formed at the very end of the wire, but rather is offset therefrom. The end is bent to form a bracket 7. The opposite end of the wire, designated 8, merely terminates in a hook 9 which is adapted to clasp the support 2. It will be seen in this figure that that portion of the wire 8 would normally lie in a different vertical plane from the bracket 7, but by slipping the wire 8 over the bracket 7, a tight frictional engagement between the hook 9 and the upright 2 is effected. In general, this form employs resilient wire. The action of the bracket 7 serves to increase the clamping effect of the helix 6 upon the upright. The hook 9 in this assembly lies between the convolutions of the helix 6 in the preferred embodiment.

The device shown in Figure 11 is desirable under ordinary conditions, but one disadvantage resides in this type of support, in that it is necessary to slip the helix 6 over the upright 2 and then slide it along until it is in the proper location.

It will be observed from the foregoing that I have devised an exceedingly desirable form of plant support. In the first place, it may be manufactured at very little cost, but its principal advantage resides in its ease of assembly and satisfactory operation. Once the upright is driven into the ground the plant engaging member may be assembled upon it in a fraction of a second. Also it will be noted that, with the exception of the device shown in Figure 11, it is not necessary to apply the clamping members over the end of the upright, as is the case with many prior structures. Once assembled, the plant engaging member remains effectively clamped to the upright at the desired position, and also remains perpendicular to the upright. While I have shown in the accompanying drawing, and have described herein, several concrete embodiments of my invention, it will be understood that I am not limited to the specific structures herein, but that the scope of my invention is to be determined solely by the breadth of the appended claims.

1. A support for plants comprising an upright member, a tensioned loop adapted to extend horizontally from the upright around the plants, and a spiral loop comprising a single convolution of a helix at each end of the plant-embracing loop and adapted to engage the upright member.

2. A support for plants comprising an upright member adapted to have one end inserted in the ground adjacent the plants to be supported, a wire bent to substantially form a loop, each end of said wire being bent to form a downwardly extending single convolution of a helix and adapted to surround the upright member to maintain the loop perpendicular to the upright.

3. A support for plants comprising an upright member, a resilient member bent to form an incomplete circle, each end of the resilient member forming a depending helix of approximately one convolution, one of said helices adapted to engage the upright member and the other adapted to also engage the upright member.

4. A support for plants comprising a pair of upright members, a member adapted to extend arcuately from one upright to the other, another member adapted to extend arcuately from one upright to the other but in the opposite direction to the first-mentioned member, each member being provided at its ends with means for engaging the uprights and maintaining the members firmly supported thereon, said means each comprising a helix of approximately one convolution.

5. A support for plants comprising a yoked upright member whose spaced ends are adapted to be inserted in the ground, and a looped member, the looped member being provided with means at its ends for engaging each arm of the yoke and maintaining the looped member substantially perpendicular thereto, said means each comprising a helix of approximately one convolution.

6. A support for plants comprising a yoked upright member with its two arms extending into the ground, a length of wire bent to substantially form a circle, one end of the wire provided with a helix of a single convolution and adapted to fit around one arm of the yoke and the other end provided with a helix of a single convolution adapted to fit around the other arm of the yoke, the said helices serving to maintain the wire substantially perpendicular to the yoke.

7. A support for plants comprising a pair of upright members, a member adapted to extend arcuately from one upright to the other, the arcuate member being provided at its ends with downwardly extending helices of approximately one convolution each for engaging the uprights and maintaining the arcuate member substantially perpendicular thereto.

8. A support for plants comprising upright support means, a loop adapted to extend at an angle from the upright support means and a single spiral convolution at each end of the loop and adapted to engage the upright support means, said single spiral convolution being in extended form to prevent sagging of the loop.

9. A support for plants comprising a yoked upright member whose spaced ends are adapted to be inserted in the ground, a looped member, the looped member having spiral convolutions at its ends of extended configuration and each comprising substantially a single convolution for engaging each arm of the yoke and maintaining the loop member from vertical sagging.

10. A support for plants comprising a pair of upright members, a member adapted to extend arcuately from one upright member to the other, the arcuate member being provided at its end with downwardly extending helices for engaging the uprights, said helices comprising approximately but one convolution of extended form, and a second arcuate member of similar construction to the first member.

TRACY H. LAY.